(12) United States Patent
Takagi et al.

(10) Patent No.: US 6,324,458 B1
(45) Date of Patent: Nov. 27, 2001

(54) DEVICE FOR CONTROLLING VEHICLE TURN BEHAVIOR WITH DISCRIMINATION OF DRIVE DIRECTION

(75) Inventors: Masashi Takagi, Susono; Hirotada Ohtake, Gamagoori; Akira Nagae, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/635,247

(22) Filed: Aug. 9, 2000

(30) Foreign Application Priority Data

Sep. 14, 1999 (JP) .................................................. 11-260259

(51) Int. Cl.$^7$ ........................................................ G06F 7/70
(52) U.S. Cl. .............................. 701/70; 701/41; 701/71; 303/188; 180/197; 180/445
(58) Field of Search ................................. 701/41, 42, 36, 701/70, 71, 72, 82; 180/197, 445; 303/147, 188, 187, 113.5

(56) References Cited

U.S. PATENT DOCUMENTS

| | | | |
|---|---|---|---|
| 5,345,385 | * | 9/1994 | Zomotor et al. ........................ 701/36 |
| 5,702,165 | * | 12/1997 | Koibuchi ............................. 303/146 |
| 5,842,754 | * | 12/1998 | Sano ................................... 303/147 |
| 5,927,421 | * | 7/1999 | Fukada ................................. 180/197 |
| 5,944,393 | * | 8/1999 | Sano ................................... 303/146 |

FOREIGN PATENT DOCUMENTS 7-117645 A     5/1995  (JP) .

* cited by examiner

*Primary Examiner*—William A. Cuchlinski, Jr.
*Assistant Examiner*—Gertrude Arthur
(74) *Attorney, Agent, or Firm*—Oliff & Berridge, PLC

(57) ABSTRACT

A device for controlling a turn running behavior of a vehicle detects at least one parameter (V, γ, Gy, Gyh, γt, γt-γ) with respect to the turn running behavior in addition to a drive direction of the vehicle, the one parameter being indicative of a higher desirability of the turn running behavior control according to changes of a magnitude thereof, calculates an amount (ΔTer, Froq, Friq, ΔTes, Fsop, Fsiq, Fsoq) for the turn running behavior control based upon the detected turn running behavior parameters, determines a start of the turn running behavior control according to the one turn running behavior parameter traversing a threshold value (Vrp, Vrq, γrp, γrq, Gyp, Gyq, Gyhp, Gyhq, Vsp, Vsq, γsp, γsq, γtsp, γtsq, Δγp, Δγq) determined therefor, and executes the turn running behavior control by operating at least one of the engine and the brake system according to the turn running behavior control amount, wherein threshold value is changed in a rearward drive of the vehicle as compared in a forward drive thereof such that the turn running behavior control is started at a lower degree of the desirability thereof in the rearward drive than in the forward drive.

20 Claims, 6 Drawing Sheets

FORWARD DRIVE
LEFT TURN

FORWARD DRIVE
RIGHT TURN

REARWARD DRIVE
LEFT TURN

REARWARD DRIVE
RIGHT TURN

DEVICE FOR CONTROLLING VEHICLE TURN BEHAVIOR WITH DISCRIMINATION OF DRIVE DIRECTION

BACKGROUND OF THE INVENTION

1. Field of the Invention

The present invention relates to a device for controlling a running behavior of a vehicle such as an automobile, and more particularly, to a device for controlling a turn running behavior of such a vehicle for a higher stability in a forward turn running as well as in a rearward turn running.

2. Description of the Prior Art

In the art of running behavior control of four-wheeled vehicles, an oversteer control (anti-spin control) and an understeer control (anti-driftout control) are well known. In the conventional turn behavior control devices, an oversteering condition is generally judged by an oversteer index based upon the slip angle of the vehicle body increasing beyond a threshold value in a direction opposite to a turning direction, and when it occurs, a front wheel serving at the outside of a turn is braked to generate an anti-spin moment in the vehicle around the braked front outside wheel, with or without a simultaneous reduction control of engine torque. When the front outside wheel is braked to control the oversteering, the cornering force of the braked front outside wheel decreases, so that the front outside wheel might slip to the outside of the turn. Such a front outside slip of the vehicle contributes to the oversteer control. On the other hand, an understeering condition is generally judged by an understeer index based upon a deviation of the actual yaw rate of the vehicle from a theoretical yaw rate calculated based upon the steering angle and the vehicle speed, and when it occurs, a rear wheel or wheels are braked to decelerate the vehicle, with a particular effect that when a rear wheel serving at the inside of a turn is braked, a turn assist yaw moment is generated in the vehicle around the braked rear inside wheel. A simultaneous reduction control of engine torque may also be made. When the rear wheel or wheels are braked to control the understeering, the cornering force of the braked rear wheels decreases, so that the rear wheels might slip to the outside of the turn. Such a rear outside slip of the vehicle contributes to the understeer control.

When a vehicle equipped with such a conventional turn behavior control device is put into an oversteering condition in a rearward turn running, its intrinsic front wheel (virtually rear wheel) serving at the outside of the turn will be braked, when the control device still operates. The braking of the virtually rear outside wheel generates an anti-spin moment in the vehicle around the braked virtually rear outside wheel, also to be effective as an oversteer control. However, the braked virtually rear outside wheel is liable to slip to the outside of the turn, and when it occurs, it cancels the oversteer control.

On the other hand, when a vehicle equipped with such a conventional turn behavior control device is put into an understeering condition in a rearward turn running, its intrinsic rear wheel (virtually front wheel) serving at the inside of the turn may be braked. The braking of the virtually front inside wheel generates an anti-driftout moment in the vehicle around the braked virtually front inside wheel, also to be effective as an understeer control. However, the braked virtually front inside wheel is liable to slip to the outside of the turn, and when it occurs, it cancels the understeer control.

In view of the above-mentioned drawback in the operation of the conventional turn behavior control in a rearward drive, it has been proposed by Japanese Patent Laid-open Publication 7-11645 to adapt such a turn behavior control to a rearward drive of a vehicle with such a modification that a braking for an oversteer control in a rearward drive is applied to a virtually front (intrinsically rear) wheel serving at the outside of the turn, while a braking for an understeer control in a rearward drive is applied to a virtually rear (intrinsically front) wheel serving at the inside of the turn.

Apart from the above matter concerned with the forward/rearward drive, with respect to the rearward turn running performance of the four-wheeled vehicles, it is noted that the vehicles are generally highly liable to deviate from a running course intended by the driver, so that the stability of the rearward turn drive of the vehicle is generally very low. An essential cause for such a turn trace instability in the rearward drive would be an inexperience of most drivers to the rearward drive, but another essential cause is considered to reside in the fact that, in the rearward drive, the point of contact of each of a pair of steered wheels with the ground surface is located ahead of the point of the steering axis of each of the pair of steered wheels traversing the ground surface along the direction of running movement of the vehicle, so that, when the pair of steered wheels are non-driven wheels, the force applied to each of the pair of steered wheels from the ground surface has an effect of augmenting a steering angle input thereto by the steering system.

SUMMARY OF THE INVENTION

In view of the above-mentioned geometric difference in the virtual steering construction from the actual steering construction of the four-wheeled vehicle due to a reversal of the drive direction of the vehicle and the accompanying inversion of the feedback performance in the steering operation from a stable negative feedback to an unstable positive feedback, it is a primary object of the present invention to provide a device for controlling a turn running behavior of a four-wheeled vehicle at each best mode in a forward as well as rearward drive of the vehicle.

According to the present invention, the above-mentioned primary object is accomplished by a device for controlling a turn running behavior of a vehicle having a vehicle body, front left, front right, rear left and rear right wheels, an engine for driving at least a rear pair or a front pair of the wheels, a steering system for steering at least the front pair or the rear pair of the wheels, and a brake system for braking each of the wheels, comprising:

means for detecting at least one parameter with respect to the turn running behavior of the vehicle in addition to a drive direction thereof, the one parameter being indicative of changes of degree of desirability of the turn running behavior control according to changes of a magnitude thereof, means for calculating an amount for the turn running behavior control based upon the turn running parameters detected by the turn running behavior parameter detection means, means for determining a start of the turn running behavior control according to the one turn running behavior parameter traversing a threshold value determined therefor, and means for executing the turn running behavior control by operating at least one of the engine and the brake system according to the turn running behavior control amount, wherein the turn running behavior control start determination means change the threshold value in a rearward drive of the vehicle as compared in a forward drive thereof such that the turn running behavior control is started at a lower degree of the desirability thereof in the rearward drive than in the forward drive.

By a four-wheeled vehicle being controlled of its turn running behavior by such a turn running behavior control device, the turn running behavior control is started at an earlier stage of progress of a liability to a turn running instability when the vehicle is driven rearward than it is driven forward, so that the higher liability to the turn running instability of the vehicle in the rearward drive is effectively suppressed by such an earlier counteraction thereto before the vehicle is put into a substantial turn running instability.

In the turn running behavior control device of the above-mentioned basic construction, the turn running behavior control start determination means may determine the one turn running behavior parameter to traverse the threshold value according to a control start determination formula common to the forward and rearward drive, the common control start determination formula discriminating the forward drive and the rearward drive from one another by a drive direction index incorporated therein, the drive direction index being varied according to a change of the drive direction.

By such an arrangement, the means for determining the start of the turn running behavior control can be adapted to the separate determinations of the start of the turn running behavior control for the forward and rearward drives by a single basic construction thereof only according to a variation of a single index element.

However, the turn running behavior control start determination means may of course determine the start of the turn running behavior control according to separate formulae for the forward and rearward drives according to a discrimination between the forward and rearward drives.

Further, in the turn running behavior control device of the above-mentioned basic construction, the turn running behavior control amount calculation means may calculate the turn running behavior control amount according to a turn running behavior control amount calculation formula common to the forward and rearward drive, the common turn running control amount calculation formula discriminating the forward drive and the rearward drive from one another by the drive direction index being varied according to a change of the drive direction.

By such an arrangement, the means for calculating the turn running behavior control amount can also be adapted to the separate calculations of the turn running behavior control amount for the forward and rearward drives by a single basic construction thereof only according to the corresponding change of the single index element.

However, the turn running behavior control amount for the forward and rearward drives my of course be calculated by separate calculation means according to a discrimination between the forward and rearward drives.

The drive direction index may be varied between "0" and "1" according to a change of the drive direction.

Further, the common turn running behavior control amount calculation formula may calculate the turn running behavior control amount for at least one of a virtually front wheel serving at the inside of a turn, a virtually front wheel serving at the outside of the turn, a virtually rear wheel serving at the inside of the turn, and a virtually rear wheel serving at the outside of the turn in either a forward drive left turn, a forward drive right turn, a rearward drive left turn or a rearward drive right turn of the vehicle, and the turn running behavior control amount calculation means may convert the turn running behavior control amount calculated for the at least one of the virtually front inside, front outside, rear inside and rear outside wheels to a corresponding turn running control amount for the front left, front right, rear left or rear right wheel according to the drive direction index and a steering direction of the steering system.

By such an arrangement, the turn running behavior control can be executed based upon the same operation mechanism regardless of the drive direction or the turning direction of the vehicle only according to the corresponding change of the drive direction index and the relationship between the virtual left and right and the intrinsic left and right of the vehicle changed over according to the change of the drive direction index.

The turn running behavior control by the turn running behavior control device according to the present invention may, as an aspect of the control, be a roll control, and the one turn running behavior parameter may be selected from vehicle speed, yaw rate of the vehicle, lateral acceleration of the vehicle and theoretically calculated lateral acceleration of the vehicle.

Further, the turn running behavior control start determination means may start the turn running behavior control when more than one of the turn running behavior parameters traverse the threshold values determined respectively therefor.

Further, the turn running behavior control by the turn running behavior control device according to the present invention, may, as another aspect of the control, be a steering performance control, and the one turn running behavior parameter may be selected from vehicle speed, yaw rate of the vehicle, target yaw rate of the vehicle and a deviation of the yaw rate from the target yaw rate.

Further, the turn running behavior control start determination means may start the turn running behavior control when more than one of the turn running behavior parameters traverse the threshold values determined respectively therefor.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1A:
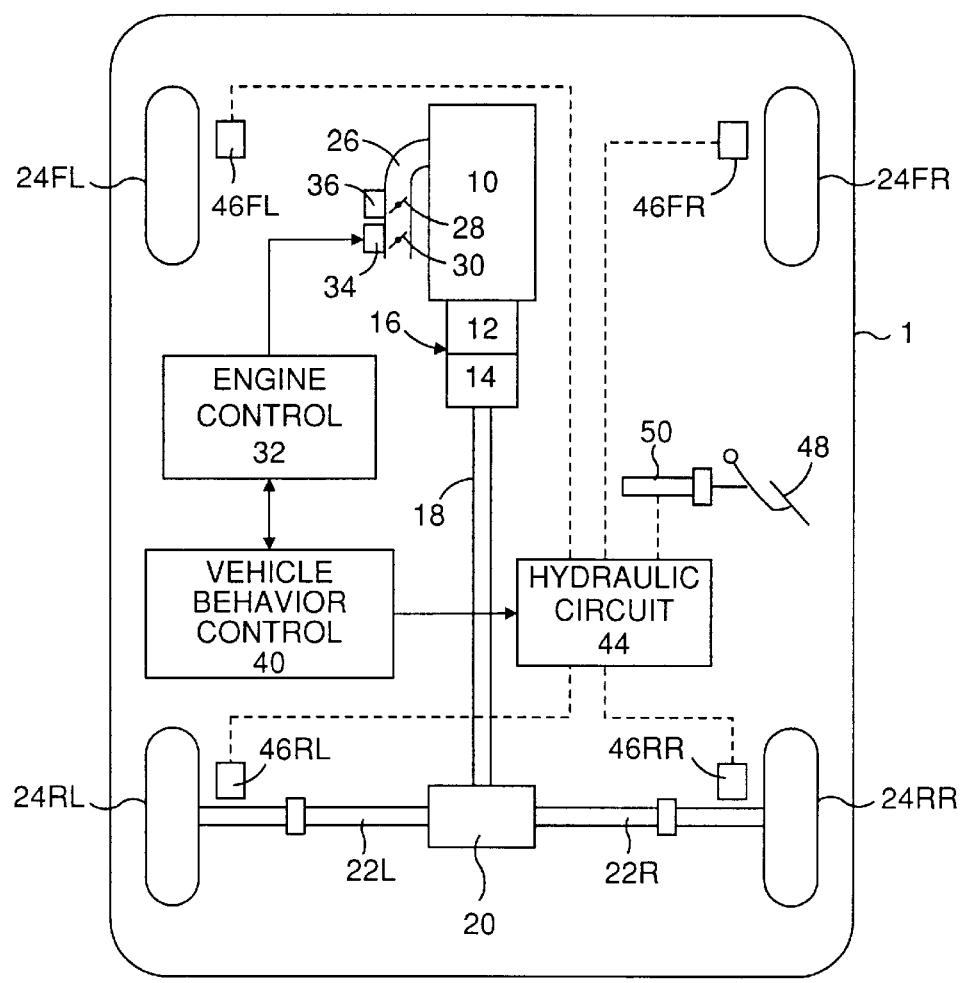
FIG. 1A is a diagrammatical illustration of a four-wheeled vehicle such as an automobile in which a vehicle behavior control device including the turn running behavior control device according to the present invention is incorporated.

Referring first to FIG. 1A, a vehicle such as an automobile diagrammatically shown therein has a vehicle body 1, an engine 10 which outputs a rotational power through a torque converter 12 and a speed change gear mechanism 14, both constructing a transmission 16 in combination, a propeller shaft 18, a differential gear 20 and left and right axles 22L and 22R toward rear left and rear right wheels 24RL and 24RR. In the figure, 24FL and 24FR are front left and front right wheels adapted to be steered by a steering system which is not shown in the figure but may be of a conventional type. The engine 10 is supplied with a fuel-air mixture through an intake passage 26 equipped with a main throttle valve 28 and a sub-throttle valve 30. The main throttle valve 28 is operated by a driver according to a depression of an accelerator pedal not shown in the figure, in while the sub-throttle valve 30 is automatically operated by engine control means 32 through an actuator 34. 36 is a throttle position sensor for detecting the opening position of the main throttle valve 28.

The engine control means 32 control the engine output under the control of the vehicle behavior control means 40 in which the brain portion of the turn running behavior control device according to the present invention is incorporated, both being constructed indeed by a common microcomputer. The vehicle behavior control means 40 operate hydraulic circuit means 44 diagrammatically shown to hydraulically operate wheel cylinders 46FL, 46FR, 46RL and 46RR for the front left, front right, rear left and rear right wheels for braking the corresponding wheels. The hydraulic circuit means 44 are also operated by a depression of a brake pedal 48 by the driver through a master cylinder 50.

Figure 1B:
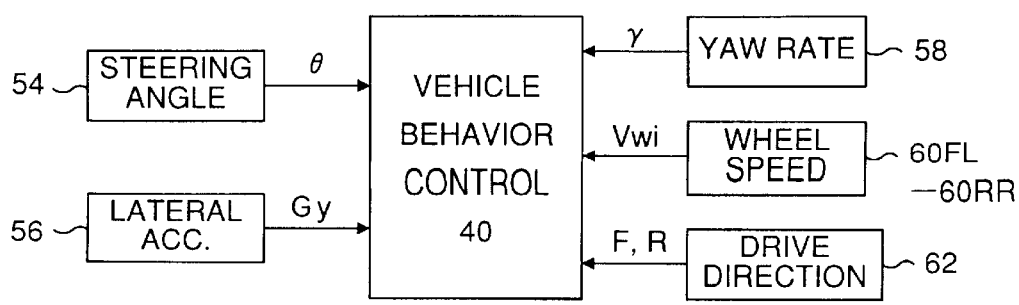
FIG. 1B is a diagram showing supplies of vehicle operation parameters to the vehicle behavior control device.

As diagrammatically shown in FIG. 1B, the vehicle behavior control means 40 are supplied with operation parameters of the vehicle such as steering angle θ from a steering angle sensor 54, lateral acceleration Gy of the vehicle from a lateral acceleration sensor 56, yaw rate γ from a yaw rate sensor 58, wheel speeds Vwi (i=fl, fr, rl and rr) from wheel speed sensors 60FL, 60FR, 60RL and 60RR, and drive direction F (forward) or R (rearward) from a running direction sensor 62 which may be provided by a shift position switch (not shown) incorporated in the transmission 16.

Further details of the turn running behavior control device will be described hereinbelow with reference to the operation thereof.

Figure 2A:
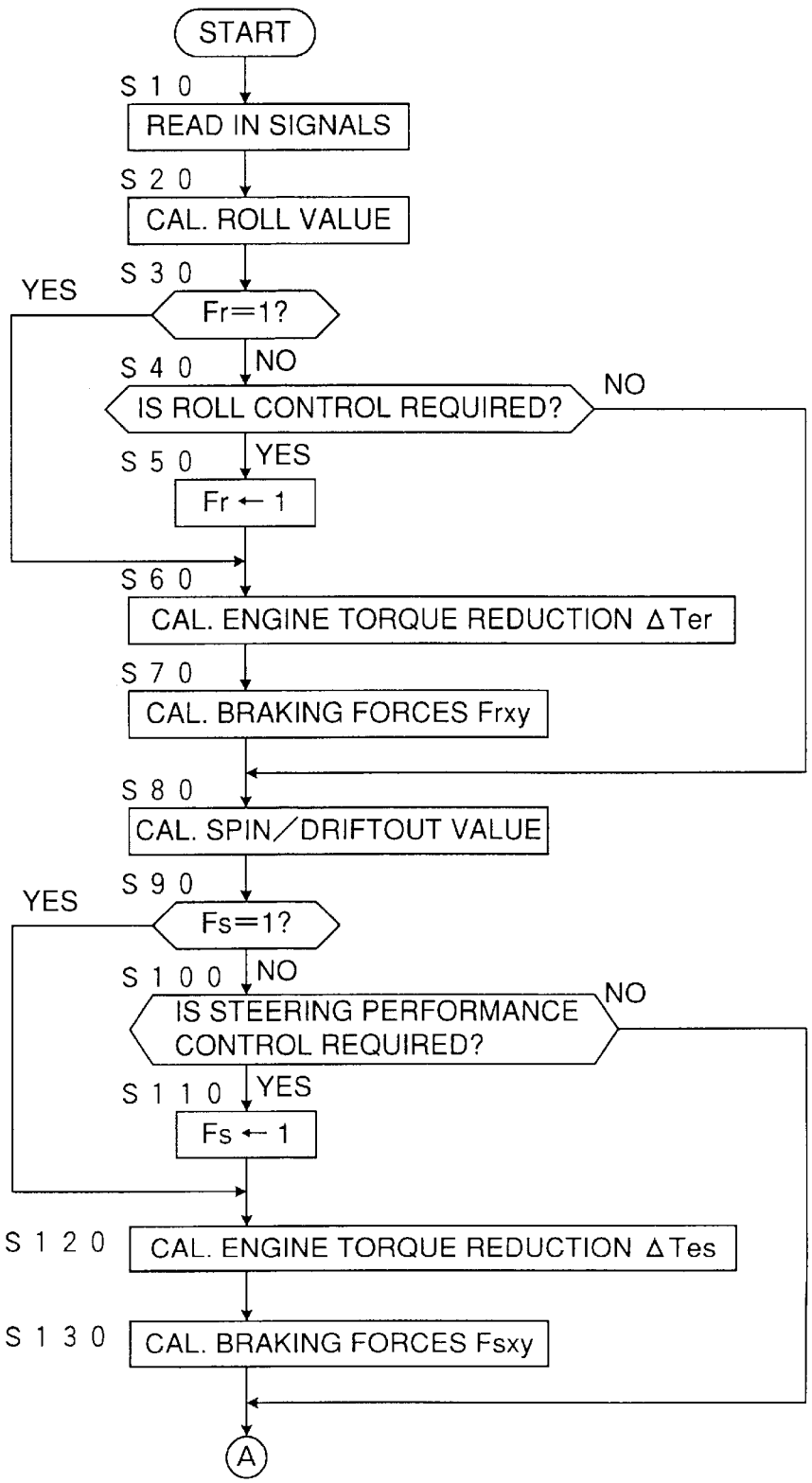
FIGS. 2A and 2B are flowcharts showing, in combination, the basic turn running behavior control carried out by the device according to the present invention.
Figure 2B:
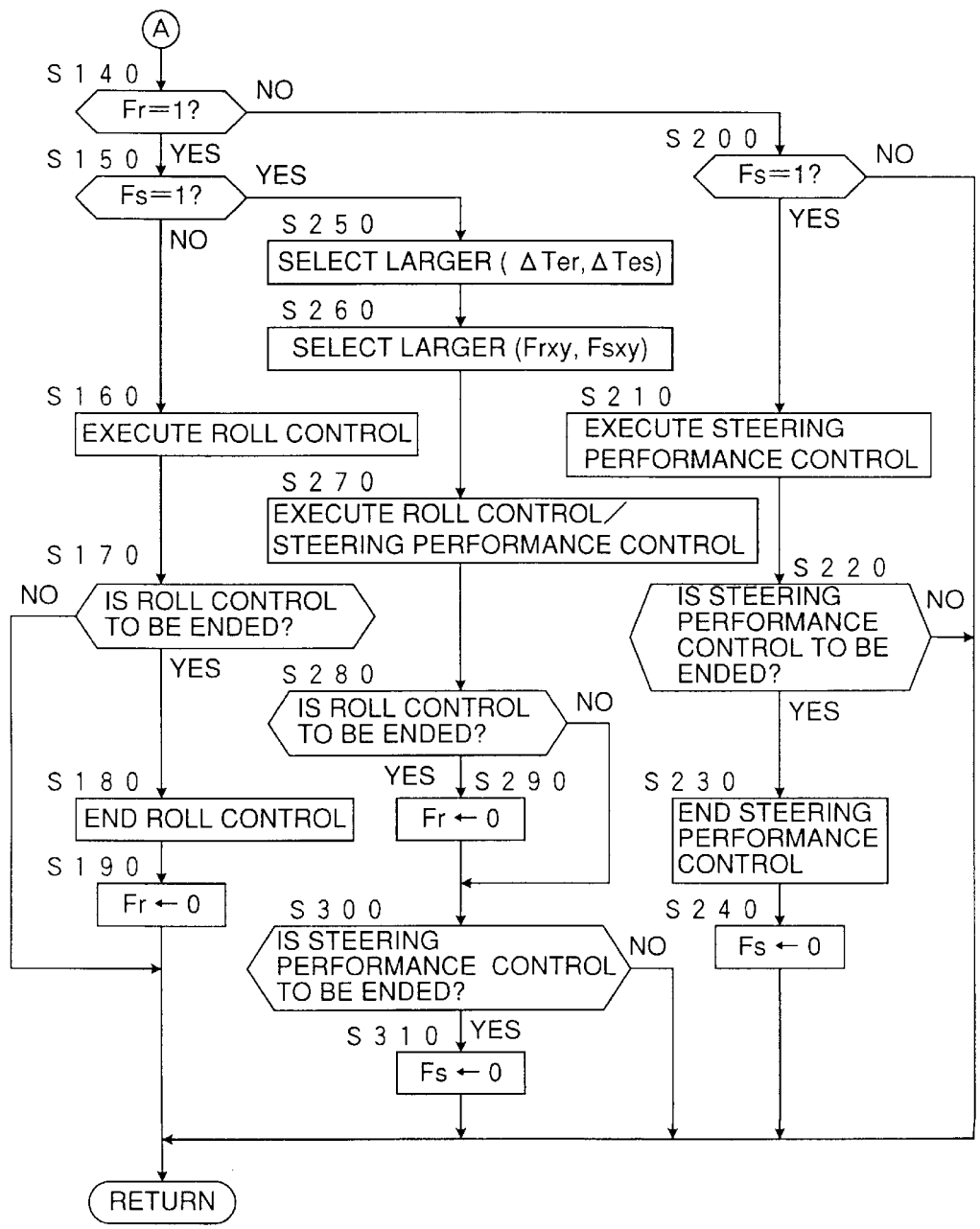

Referring to FIGS. 2A and 2B, when the device is put into operation by a closure of an ignition switch (not shown) or a particular selection switch provided therefor (not shown), in step 10 signals such as those shown in FIG. 1B are read in.

Then in step 20, a parameter R herein called "roll value", indicating a liability of the vehicle to over-roll due to a turn running, is calculated as follows:

$$R = |k_1 Gy + k_2 Gy + k_3 Gyh + k_4 Gyh|$$

wherein $Gyh = V^2 \theta / \{(1 + AV^2) NL\}$, V is vehicle speed (available from Vwi). N is a gear ratio of the steering system, L is the so-called wheel base, and A, $k_1$, $k_2$, $k_3$ and $k_4$ are appropriate coefficients. As will be noted, the liability of the vehicle to over-roll increases according to an increase of the roll value R.

In this connection, it is to be noted that parameters such as θ, Gy and γ are dependent on the direction of turn of the vehicle, while V or Vwi are dependent on the drive direction of the vehicle. In the following, θ, Gy, γ or other parameters dependent on the direction of turn of the vehicle will be considered to be positive for a left turn and negative for a right turn, while V, Vwi or other parameters dependent on the drive direction of the vehicle will be considered to be positive for a forward drive and negative for a rearward drive.

Then, in step 30, it is judge if a flag Fr is 1. The flag Fr is reset to 0 at the start of the control by the initialization, and therefore, in the first pass the answer is no, so that the control proceeds to step 40.

In step 40, it is judged if a roll control is required. For this judgment, as some embodiments, at least one of the following conditions is judged:

$$|V| \geq Vrp(1-M) + VrqM$$

$$|\gamma| \geq \gamma rp(1-M) + \gamma rqM$$

$$|Gy| \geq Gyp(1-M) + GyqM$$

$$|Gyh| \geq Gyhp(1-M) + GyhqM$$

In the above formulae, M is a drive direction index which is made 0 when the vehicle is driven forward, while it is made 1 when the vehicle is driven rearward. M is determined according to the signal from the drive direction sensor 62.

Vrp is a threshold value for the absolute value of the vehicle speed V to exceed (i.e. traverse in the increasing direction) for the turn running behavior control device according to the present invention to start a roll control such as described hereinbelow when the vehicle is driven forward, while Vrq is a threshold value for the absolute value of the vehicle speed V to exceed for the turn running behavior control device according to the present invention to start the roll control when the vehicle is driven rearward. The relationship between Vrp and Vrq is determined to be Vrp>Vrq, so that the anti-roll turn running behavior control is started at a lower level of vehicle speed V in a rearward drive than in a forward drive.

Similarly, γrp is a threshold value for the absolute value of the yaw rate γ to exceed for the turn running behavior control device according to the present invention to start the roll control when the vehicle is driven forward, while γrq is a threshold value for the absolute value of the yaw rate γ to exceed for the turn running behavior control device according to the present invention to start the roll control when the vehicle is driven rearward. Similarly, the relationship between γrp and γrq is determined to be γrp>γrq for the same reason described above with respect to the vehicle speed.

Similarly, Gyrp is a threshold value for the absolute value of the lateral acceleration Gy to exceed for the turn running behavior control device according to the present invention to start the roll control when the vehicle is driven forward, while Gyrq is a threshold value for the absolute value of the lateral acceleration Gy to exceed for the turn running behavior control device according to the present invention to start the roll control when the vehicle is driven rearward. Similarly, the relationship between Gyrp and Gyrq is determined to be Gyrp>Gyrq for the same reason described above with respect to the vehicle speed.

Similarly, Gyhrp is a threshold value for the absolute value of the parameter Gyh to exceed for the turn running behavior control device according to the present invention to start the roll control when the vehicle is driven forward, while Gyhrq is a threshold value for the absolute value of the parameter Gyh to exceed for the turn running behavior control device according to the present invention to start the roll control when the vehicle is driven rearward. Similarly, the relationship between Gyhrp and Gyhrq is determined to be Gyhrp>Gyhrq for the same reason described above with respect to the vehicle speed.

Thus, it will be appreciated that when the vehicle is driven forward, when $|V|$, $|\gamma|$, $|Gy|$ or $|Gyh|$ increases beyond Vrp, γrp, Gyp or Gyhp, respectively, the roll control is started, while when the vehicle is driven rearward, the roll control is started earlier when $|V|$, $|\gamma|$, $|Gy|$ or $|Gyh|$ increases beyond Vrq, γrq, Gyq or Gyhq, respectively, which are respectively smaller than Vrp, γrp, Gyp or Gyhp determined for the forward drive.

When the answer of step 40 is yes, the control proceeds to step 50, and the flag Fr is set to 1, so that when the roll control was once started, the roll control is continued until a separate judgment for ending the roll control is made as described hereinbelow.

Figure 4:
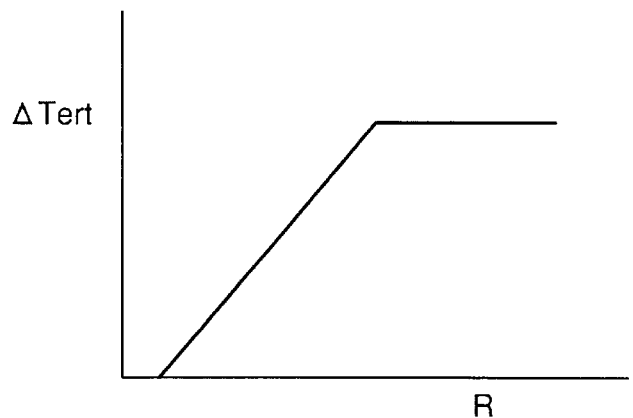
FIG. 4 is an example of a map for determining the target engine torque reduction $\Delta Tert$ based upon roll value R.

In step 60, an engine torque reduction ΔTer for the roll control is calculated based upon the roll value R by looking at a map such as shown in FIG. 4, as follows:

First, a target engine torque reduction ΔTert is obtained based upon the value of R, and then, the engine torque reduction ΔTer by which the engine torque is lowered for suppressing an over-rolling of the vehicle body is calculated as follows:

$$\Delta Ter = \Delta Tert(1-M) + Q_1 \Delta TertM$$

wherein $Q_1$ is a modification factor for modifying the engine torque reduction ΔTer for the roll control in the rearward drive relative to that in the forward drive. The value of $Q_1$ may be determined appropriately, including 1.00, according to the design of the control.

Figure 5:
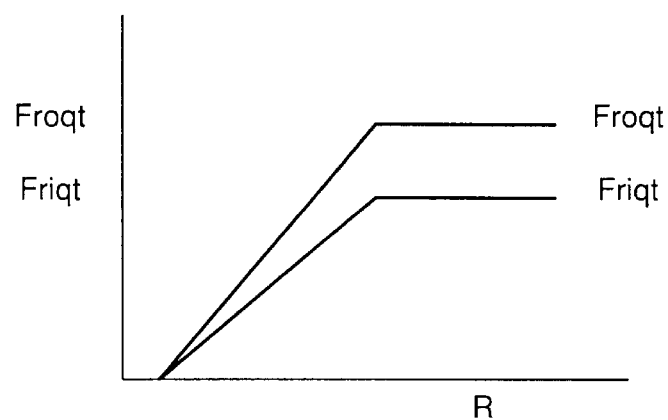
FIG. 5 is an example of a map for determining the target braking forces Froqt and Friqt based upon roll value R.

In step 70, braking forces Frxy for the roll control are calculated based upon the roll value R by looking at a map such as shown in FIG. 5, as follows:

First, a target braking force Froqt for a virtually rear wheel serving at the outside of a turn and a target braking force Friqt for a virtually rear wheel serving at the inside of the turn are calculated based upon the roll value R by looking at a map such as shown in FIG. 5.

Then, a braking force Froq for the virtually rear wheel serving at the outside of the turn and a braking force Friq for the virtually rear wheel serving at the inside of the turn are calculated as follows:

$$Froq = Froqt(1-M) + Q_{21} FroqtM$$

$$Friq = Friqt(1-M) + Q_{22} FriqtM$$

wherein $Q_{21}$ and $Q_{22}$ are modification factors for modifying the braking forces Froq and Friq for the roll control in the rearward drive relative to those in the forward drive. The values of $Q_{21}$ and $Q_{22}$ may be determined appropriately, including 1.00, according to the design of the control.

Figure 3:
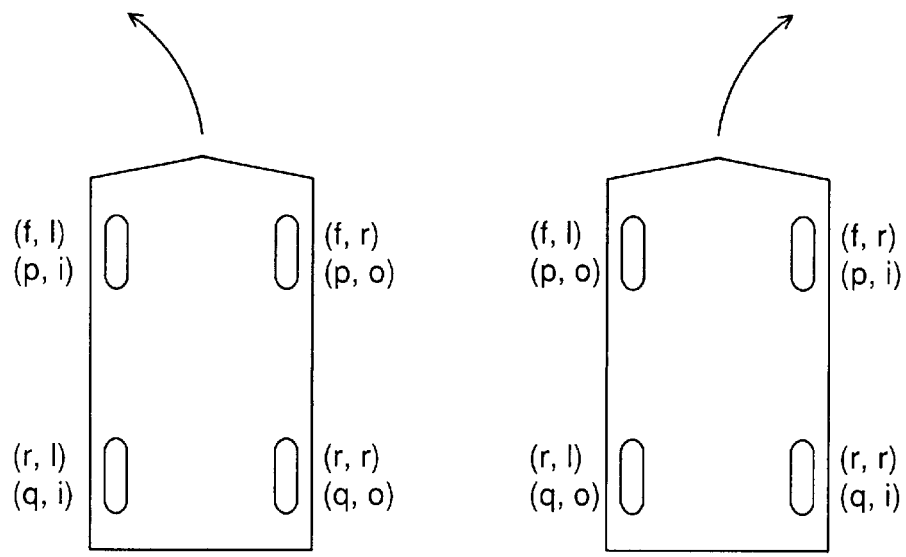
FIG. 3 is a schema showing the relationship between the intrinsic front left, front right, rear left and rear right wheels and the virtually front inside, front outside, rear inside and rear outside wheels in a four-wheeled vehicle according to the drive direction and the turning direction.
Figure 3:
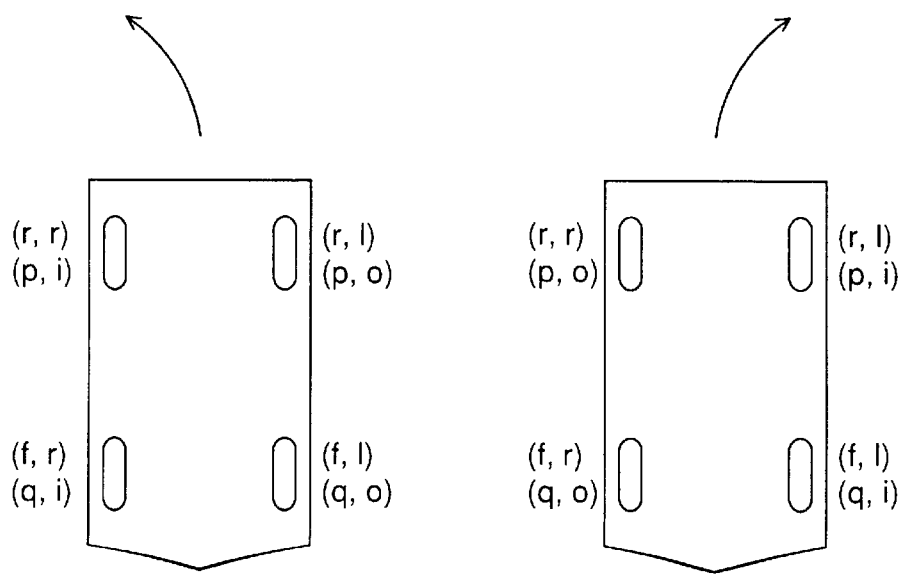

The correspondence between the virtually front inside, front outside, rear inside and rear outside wheels and the intrinsically front left, front right, rear left and rear right wheels in the forward drive left turn, forward drive right turn, rearward drive left turn and rearward drive right turn is as shown in FIG. 3, wherein the virtually front and rear as viewed along the drive direction are denoted by p and q, respectively, while the virtually inside and outside of the turning direction are denoted by i and o, respectively.

The braking forces Froq and Friq are applied to the corresponding intrinsic wheels according to the above relationship based upon the discrimination of the drive direction and the turning direction. The discrimination of the drive direction is directly available from the signal of the drive direction sensor 62, while the virtual turning direction will be available by processing a turning direction of the steering system with the signal of the drive direction sensor 62.

Subsequent to the calculations by steps 60 and 70, the control proceeds to step 80. When the answer of step 40 is no, the control proceeds to step 80 while bypassing steps 50, 60 and 70.

In step 80, parameters SV and DV herein called "spin value" and "driftout value", respectively, are calculated.

The spin value SV is calculated by first calculating a difference ΔGy between the lateral acceleration Gy detected by the lateral acceleration sensor 56 and a product of the yaw rate γ detected by the yaw rate sensor 58 and the vehicle speed V available from the wheel speeds Vwi detected by the wheel speed sensors 60FL–60RR, such as ΔGy=G−γV, then integrating ΔGy on a time basis to obtain a lateral slip velocity Vy, then calculating a slip angle β as a ratio of the lateral slip velocity to the longitudinal velocity Vx of the vehicle, i.e. vehicle speed V, such as, β=Vy/Vx, and then as follows:

$$SV = |k_{10}\beta + k_{11}\dot\beta|$$

wherein $k_{10}$ and $k_{11}$ are appropriate coefficients which may be determined according to the design of the control. As will be appreciated from the deduction thereof, the spin value SV indicates a higher liability of the vehicle to oversteer as it increases.

On the other hand, the driftout value DV is calculated by first calculating a due yaw rate γc such as γc=Vθ/(NL)−$k_{20}$VGy according to the vehicle speed V, steering angle θ, steering system gear ratio N, wheel base L, lateral acceleration Gy and an appropriate coefficient $k_{20}$, then processing the due yaw rate γc for a delay such as γt=γc/(1+Ts) by a time delay constant T and a composite variable s in the Laplace conversion, and then as the absolute value of a difference between γt and γ, such as DV=|γt−γ|. As will be appreciated from the deduction thereof, the driftout value DV indicates a higher liability of the vehicle to understeer as it increases.

Then, in step 90, it is judge if a flag Fs is 1. The flag Fs is reset to 0 at the start of the control by the initialization, and therefore, the answer is no in the first pass, so that the control proceeds to step 100.

In step 100, it is judged if a steering performance control is required. For this judgment, as some embodiments, at least one of the following conditions is judged:

$$|V| \geq Vsp(1-M) + VsqM$$

$$|\gamma| \geq \gamma sp(1-M) + \gamma sqM$$

$$|\gamma t| \geq \gamma tsp(1-M) + \gamma tsqM$$

$$|\gamma t - \gamma| \geq \Delta\gamma p(1-M) + \Delta\gamma qM$$

wherein Vsp is a threshold value for the absolute value of the vehicle speed V to exceed for the turn running behavior control device according to the present invention to start a steering performance control such as described hereinbelow when the vehicle is driven forward, while Vsq is a threshold value for the absolute value of the vehicle speed V to exceed for the turn running behavior control device according to the present invention to start the steering performance control when the vehicle is driven rearward. The relationship between Vsp and Vsq is determined to be Vsp>Vsq, so that the anti-spin or anti-driftout turn running behavior control is started at a lower level of the vehicle speed V in a rearward drive than in a forward drive.

Similarly, γsp or γtsp is a threshold value for the absolute value of the yaw rate γ or the target yaw rate γt to exceed for the turn running behavior control device according to the present invention to start the steering performance control when the vehicle is driven forward, while γsq or γtsq is a threshold value for the absolute value of the yaw rate γ or the target yaw rate γt to exceed for the turn running behavior control device according to the present invention to start the steering performance control when the vehicle is driven rearward. Similarly, the relationship between γsp and γrs or γtsp and γtrs is determined to be γsp>γsq or γtsp>γtsq, respectively for the same reason described above with respect to the vehicle speed.

Similarly, Δγp is a threshold value for the absolute value of the yaw rate difference γt−γ to exceed for the turn running behavior control device according to the present invention to start the steering performance control when the vehicle is driven forward, while Δγq is a threshold value for the absolute value of the yaw rate difference γt−γ to exceed for the turn running behavior control device according to the present invention to start the steering performance control when the vehicle is driven rearward. Similarly, the relationship between Δγp and Δγq is determined to be Δγp>Δγq for the same reason described above with respect to the vehicle speed.

Thus, it will be appreciated that when the vehicle is driven forward, when $|V|$, $|\gamma|$, $|\gamma t|$ or $|\gamma t-\gamma|$ increases beyond Vsp, γsp, γtsp or Δγp, respectively, the steering performance control is started, while when the vehicle is driven rearward, the steering performance control is started earlier when $|V|$, $|\gamma|$, $|\gamma t|$ or $|\gamma t-\gamma|$ increases beyond Vsq, γsq, γtsq or Δγq, respectively, which are respectively lower than Vsp, γsp, γtsp or Δγp determined for the forward drive.

When the answer of step 100 is yes, the control proceeds to step 110, and the flag Fs is set to 1, so that when the steering performance control was once started, the steering performance control is continued until a separate judgment for ending the steering performance control is made as described hereinbelow.

Figure 6:
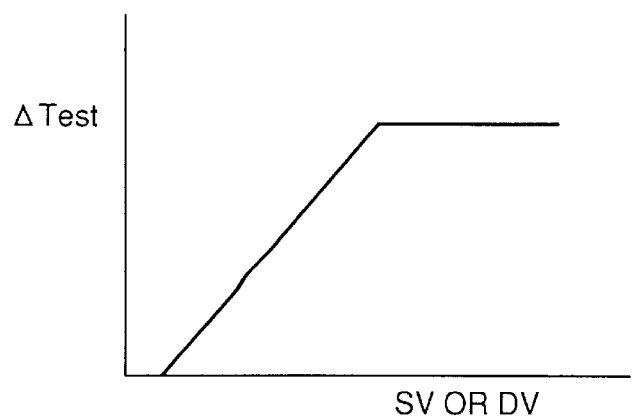
FIG. 6 is an example of a map for determining the target engine torque reduction $\Delta Test$ based upon the spin value SV or the driftout value DV.

In step 120, an engine torque reduction ΔTes for the steering performance control is calculated based upon the spin value SV and the driftout value DV by looking at a map such as shown in FIG. 6 as follows:

First, a target engine torque reduction ΔTest is obtained based upon each of the values of SV and DV. The value of ΔTest to be obtained may be a sum of ΔTest read out based upon SV and ΔTest read out based upon DV. However, since an oversteer (spin) and an understeer (driftout) do not generally occur at the same time, such a sum will generally express ΔTest read out based upon SV when the vehicle is oversteering or ΔTest read out based upon DV when the vehicle is understeering. Then, the engine torque reduction ΔTes by which the engine torque is lowered for suppressing an oversteering or an understeering of the vehicle is calculated as follows:

$$\Delta Tes = \Delta Test(1-M) + Q_3 \Delta TertM$$

wherein $Q_3$ is a modification factor for modifying the engine torque reduction ΔTes for the steering performance control in the rearward drive relative to that in the forward drive. The value of $Q_3$ may be appropriately determined, including 1.00, according to the design of the control.

Figure 7:
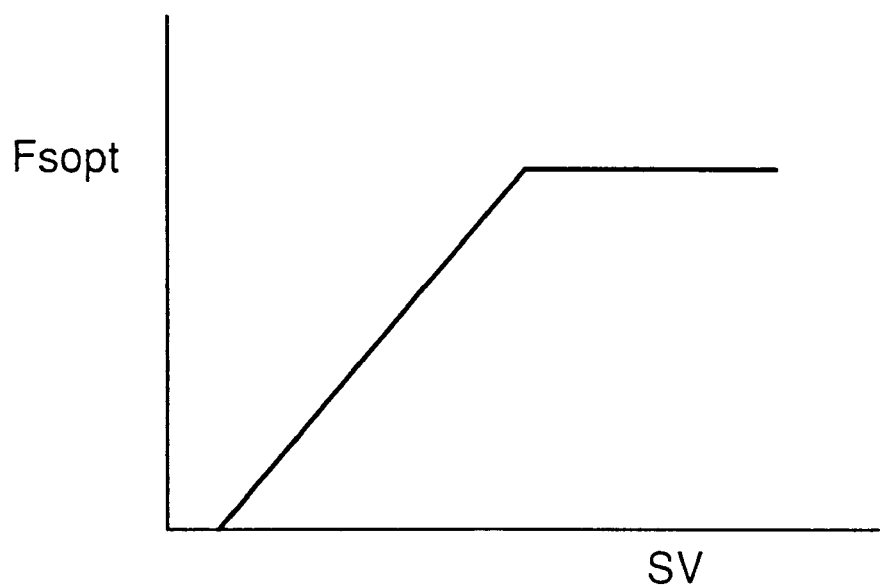
FIG. 7 is an example of a map for determining the target braking force Fsopt based upon the spin value SV.
Figure 8:
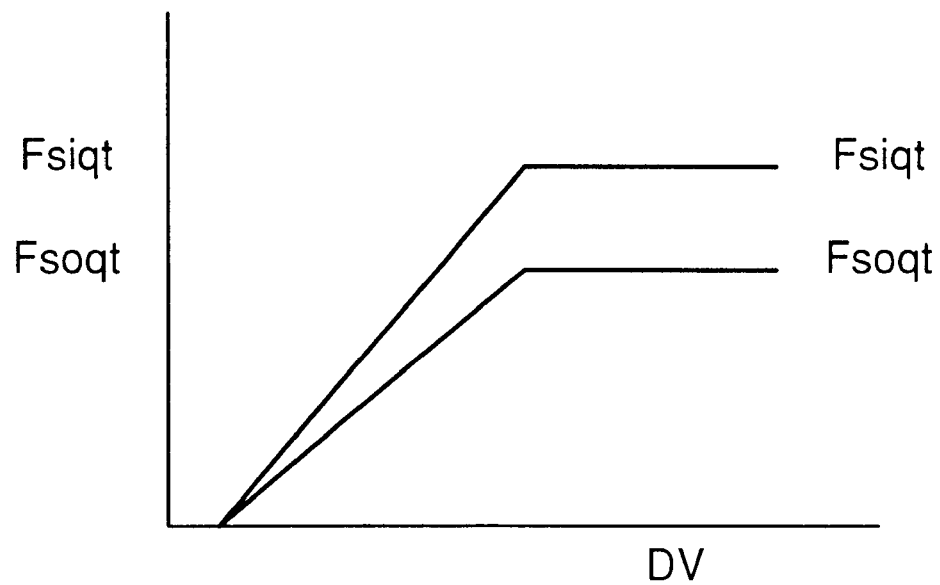
FIG. 8 is an example of a map for determining the target braking forces Fsiqt and Fsoqt based upon the driftout value DV.

In step 130, braking forces Fsxy for the steering performance control are calculated based upon the spin value SV and the driftout value DV by looking at maps such as shown in FIGS. 7 and 8, respectively, as follows:

First, a target braking force Fsopt for a virtually front wheel serving at the outside of a turn is calculated based upon the spin value SV by looking at the map of FIG. 7.

Then, a braking force Fsop for the virtually front wheel serving at the outside of the turn is calculated as follows:

$$Fsop = Fsopt(1-M) + Q_4 FsoptM$$

wherein $Q_4$ is a modification factor for modifying the braking force Fsop for the steering performance control in the rearward drive relative to that in the forward drive. The value of $Q_4$ may be appropriately determined, including 1.00, according to the design of the control. The braking force Fsop thus obtained to be applied to the virtually front wheel serving at the outside of a turn is indeed a braking force for suppressing an oversteering.

Then, a target braking force Fsiqt for a virtually rear wheel serving at the inside of a turn and a target braking force Fsoqt for a virtually rear wheel serving at the outside of the turn are calculated based upon the driftout value DV by looking at the map of FIG. 8.

Then, a braking force Fsiq for the virtually rear wheel serving at the inside of the turn and a braking force Fsoq for the virtually rear wheel serving at the outside of the turn are calculated as follows:

$$Fsiq = Fsiqt(1-M) + Q_{51} FsiqtM$$

$$Fsoq = Fsoqt(1-M) + Q_{52} FsoqtM$$

wherein $Q_{51}$ and $Q_{52}$ are modification factors for modifying the braking forces Fsiq and Fsoq for the steering performance control in the rearward drive relative to those in the forward drive. The values of $Q_{51}$ and $Q_{52}$ may be appropriately determined, including 1.00, according to the design of the control.

The braking forces Fsop, Fsiq and Fsoq are applied to the corresponding intrinsic wheels according to the above-mentioned relationship based upon the discrimination of the drive direction and the turning direction.

In step 140, it is judge if the flag Fr is 1. When the answer is yes, the control proceeds to step 150, and it is judged if the flag Fs is 1. When the answer is no, it is meant that the operating condition of the vehicle is such that only the roll control is required. Therefore, in step 160 the roll control is executed such that the engine torque is decreased by the engine torque reduction ΔTer, while the virtually rear outside and inside wheels are braked by the braking forces Froq and Friq, respectively, with a conversion of the virtually rear outside and inside wheels to the corresponding intrinsic wheels of the vehicle according to the above-mentioned relationship based upon the drive direction and the turning direction.

In step 170, it is judge if the roll control is to be ended. This judgment may be made in a manner similar to that made in step 40 by setting up appropriately lowered threshold levels for the respective turn running behavior parameters to fall therebelow for the turn running behavior control device according to the present invention to end the roll control, with a similar discrimination between the forward drive and the rearward drive, if also desired. When the answer is yes, then in step 180 the roll control is ended, and in step 190 the flag Fr is reset to 0. When the answer of step 170 is no, the control bypasses steps 180 and 190.

When the answer of step 140 is no, the control proceeds to step 200, and it is judged if the flag Fs is 1. When the answer is yes, it is meant that the operating condition of the vehicle is such that only the steering performance control is required. Then the control proceeds to step 210, and the steering performance control is executed such that the engine torque is decreased by the engine torque reduction $\Delta$Tes, while the virtually front outside wheel is braked by the braking force Fsop when the steering performance control is in fact an oversteer control or the virtually rear inside and outside wheels are braked by the braking forces Fsiq and Fsoq, respectively, when the steering performance control is in fact an understeer control also with a conversion of the virtually front outside, rear inside and rear outside wheels to the corresponding intrinsic wheels of the vehicle according to the above-mentioned relationship based upon the drive direction and the turning direction Then in step 220, it is judge if the steering performance control is to be ended. This judgment may also be made in a manner similar to that made in step 100, by setting up appropriately lowered threshold levels for the respective parameters to fall therebelow for the turn running behavior control device according to the present invention to end the steering performance control, with a similar discrimination between the forward drive and the rearward drive, if also desired. When the answer is yes, then in step 230 the roll control is ended, and in step 240 the flag Fs is reset to 0. When the answer of step 220 is no, the control bypasses steps 230 and 240.

When the answer of step 150 is yes, it is meant that the operating condition of the vehicle is such that both of the roll control and the steering performance control are required. Then, the control proceeds to step 250, and a larger of the engine torque reductions $\Delta$Ter and $\Delta$Tes calculated for the roll control and the steering performance control is selected. Further, in step 260, a larger of the braking forces Frxy and Fsxy calculated for the roll control and the steering performance control is selected such that with respect to each of the virtually front inside, front outside, rear inside and rear outside wheels, a larger one is selected. In view of such performances of $\Delta$Ter vs. $\Delta$Tes and Frxy vs. Fsxy as exemplarily shown in FIGS. 4–8, it will be appreciated that there a good prospect in executing the engine torque reduction control by selecting a larger of $\Delta$Ter and $\Delta$Tes and the braking control by selecting a larger of Frxy and Fsxy when both of the roll control and the steering performance control are required.

Therefore, in step 270, the roll control and the steering performance control are executed in combination.

In step 280, it is judge if the roll control is to be ended. This judgment may be the same as that in step 170. When the answer is yes, in step 290 the flag Fr is reset to 0. When the answer of step 280 is no, step 290 is bypassed.

In step 300, it is judge if the steering performance control is to be ended. This judgment may be the same as that in step 220. When the answer is yes, in step 310 the flag Fs is reset to 0. When the answer of step 300 is no, step 310 is bypassed.

When the flag Fr was reset to 0 in step 290, the control will proceed from step 140 to step 200 in the next circulation through the flowchart in the next circulation through the flowchart, so that the roll/steer combination control is switched over to the steering performance control thereafter, while when the flag Fs was reset to 0 in step 310, the control will proceed from step 150 to step 160 in the next circulation through the flowchart, so that the roll/steer combination control is switched over to the roll control thereafter.

Although the present invention has been described in detail with respect to some preferred embodiments thereof, it will be apparent for those skilled in the art that various modifications are possible with respect to the shown embodiments within the scope of the present invention.

What is claimed is:

1. A device for controlling a turn running behavior of a vehicle having a vehicle body, front left, front right, rear left and rear right wheels, an engine for driving at least a rear pair or a front pair of the wheels, a steering system for steering at least the front pair or the rear pair of the wheels, and a brake system for braking each of the wheels, comprising:

means for detecting at least one parameter with respect to the turn running behavior of the vehicle in addition to a drive direction thereof, the one parameter being indicative of changes of degree of desirability of the turn running behavior control according to changes of a magnitude thereof, means for calculating an amount for the turn running behavior control based upon the turn running behavior parameters detected by the turn running behavior parameter detection means, means for determining a start of the turn running behavior control according to the one turn running behavior parameter traversing a threshold value determined therefor, and means for executing the turn running behavior control by operating at least one of the engine and the brake system according to the turn running behavior control amount, wherein the turn running behavior control start determination means change the threshold value in a rearward drive of the vehicle as compared in a forward drive thereof such that the turn running behavior control is started at a lower degree of the desirability thereof in the rearward drive than in the forward drive.

2. A device according to claim 1, wherein the turn running behavior control start determination means determine the one turn running behavior parameter to traverse the threshold value according to a control start determination formula common to the forward and rearward drive, the common control start determination formula discriminating the forward drive and the rearward drive from one another by a drive direction index incorporated therein, the drive direction index being varied according to a change of the drive direction.

3. A device according to claim 2, wherein the drive direction index is varied between "0" and "1" according to a change of the drive direction.

4. A device according to claim 2, wherein the turn running behavior control amount calculation means calculate the turn running behavior control amount according to a turn running behavior control amount calculation formula common to the forward and rearward drive, the common turn running behavior control amount calculation formula discriminating the forward drive and the rearward drive from one another by the drive direction index being varied according to a change of the drive direction.

5. A device according to claim 4, wherein the drive direction index is varied between "0" and "1" according to a change of the drive direction.

6. A device according to claim 4, wherein the common turn running behavior control amount calculation formula calculate the turn running behavior control amount for at least one of a virtually front wheel serving at the inside of a turn, a virtually front wheel serving at the outside of the turn, a virtually rear wheel serving at the inside of the turn, and a virtually rear wheel serving at the outside of the turn in either a forward drive left turn, a forward drive right turn, a rearward drive left turn or a rearward drive right turn of the vehicle, and the turn running behavior control amount calculation means convert the turn running behavior control amount calculated for the at least one of the virtually front inside, front outside, rear inside and rear outside wheels to a corresponding turn running behavior control amount for the front left, front right, rear left or rear right wheel according to the drive direction index and a steering direction of the steering system.

7. A device according to claim 1, wherein the turn running behavior control is a roll control, and the one turn running behavior parameter is selected from vehicle speed, yaw rate the vehicle, lateral acceleration of the vehicle and theoretically calculated lateral acceleration of the vehicle.

8. A device according to claim 7, wherein the turn running behavior control start determination means start the turn running behavior control when more than one of the turn running behavior parameters traverse the threshold values determined respectively therefor.

9. A device according to claim 1, wherein the turn running behavior control is a steering performance control, and the one turn running behavior parameter is selected from vehicle speed, yaw rate of the vehicle, target yaw rate of the vehicle and a deviation of the yaw rate from the target yaw rate.

10. A device according to claim 9, wherein the turn running behavior control start determination means start the turn running behavior control when more than one of the turn running behavior parameters traverse the threshold values determined respectively therefor.

11. A method for controlling a turn running behavior of a vehicle having a vehicle body, front left, front right, rear left and rear right wheels, an engine for driving at least a rear pair or a front pair of the wheels, a steering system for steering at least the front pair or the rear pair of the wheels, and a brake system for braking each of the wheels, comprising the steps of:

detecting at least one parameter with respect to the turn running behavior of the vehicle in addition to a drive direction thereof, the one parameter being indicative of changes of degree of desirability of the turn running behavior control according to changes of a magnitude thereof, calculating an amount for the turn running behavior control based upon the turn running parameters detected by the turn running behavior parameter detection means, determining a start of the turn running behavior control according to the one turn running behavior parameter traversing a threshold value determined therefor, and executing the turn running behavior control by operating at least one of the engine and the brake system according to the turn running behavior control amount, wherein the threshold value is changed in a rearward drive of the vehicle as compared in a forward drive thereof such that the turn running behavior control is started at a lower degree of the desirability thereof in the rearward drive than in the forward drive.

12. A method according to claim 11, wherein the one turn running behavior parameter to traverse the threshold value is determined according to a control start determination formula common to the forward and rearward drive, the common control start determination formula discriminating the forward drive and the rearward drive from one another by a drive direction index incorporated therein, the drive direction index being varied according to a change of the drive direction.

13. A method according to claim 12, wherein the turn running behavior control is started when more than one of the turn running behavior parameters traverse the threshold values determined respectively therefor.

14. A method according to claim 12, wherein the drive direction index is varied between "0" and "1" according to a change of the drive direction.

15. A method according to claim 12, wherein the turn running behavior control amount is calculated according to a turn running behavior control amount calculation formula common to the forward and rearward drive, the common turn running behavior control amount calculation formula discriminating the forward drive and the rearward drive from one another by the drive direction index being varied according to a change of the drive direction.

16. A method according to claim 15, wherein the drive direction index is varied between "0" and "1" according to a change of the drive direction.

17. A method according to claim 15, wherein the turn running behavior control amount is calculated for at least one of a virtually front wheel serving at the inside of a turn, a virtually front wheel serving at the outside of the turn, a virtually rear wheel serving at the inside of the turn, and a virtually rear wheel serving at the outside of the turn in either a forward drive left turn, a forward drive right turn, a rearward drive left turn or a rearward drive right turn, and the turn running behavior control amount calculated for the at least one of the virtually front inside, front outside, rear inside and rear outside wheels is converted to a corresponding turn running control amount for the front left, front right, rear left or rear right wheel according to the drive direction index and a steering direction of the steering system.

18. A method according to claim 11, wherein the turn running behavior control is a roll control, and the one turn running behavior parameter is selected from vehicle speed, yaw rate of the vehicle, lateral acceleration of the vehicle and theoretically calculated lateral acceleration of the vehicle.

19. A method according to claim 11, wherein the turn running behavior control is a steering performance control, and the one turn running behavior parameter is selected from vehicle speed, yaw rate of the vehicle, target yaw rate of the vehicle and a deviation of the yaw rate from the target yaw rate.

20. A method according to claim 19, wherein the turn running behavior control is started when more than one of the turn running behavior parameters traverse the threshold values determined respectively therefor.

* * * * *

UNITED STATES PATENT AND TRADEMARK OFFICE
CERTIFICATE OF CORRECTION

PATENT NO. : 6,324,458 B1  Page 1 of 1
DATED : November 27, 2001
INVENTOR(S) : Masashi Takagi et al.

It is certified that error appears in the above-identified patent and that said Letters Patent is hereby corrected as shown below:

Column 2,
Line 2, replace "7-11645" with -- 7-117645 --.

Signed and Sealed this

Eighteenth Day of June, 2002

*Attest:*

*Attesting Officer*

JAMES E. ROGAN
*Director of the United States Patent and Trademark Office*